United States Patent [19]
Reid

[11] Patent Number: 5,148,976
[45] Date of Patent: Sep. 22, 1992

[54] THERMOSTATIC MIXING VALVE

[75] Inventor: William Reid, Elderslie, Scotland

[73] Assignee: The Horne Engineering Co., Ltd., Johnstone, England

[21] Appl. No.: 670,415

[22] Filed: Mar. 15, 1991

[30] Foreign Application Priority Data

Mar. 17, 1990 [GB] United Kingdom ............ 9006069

[51] Int. Cl.$^5$ ............................................. G05D 23/13
[52] U.S. Cl. ................................................. 236/12.2
[58] Field of Search .............. 236/12.15, 12.16, 12.2, 236/12.21, 12.22

[56] References Cited

U.S. PATENT DOCUMENTS

| 2,449,766 | 9/1948 | Brown | 236/12.21 X |
| 3,827,016 | 7/1976 | Knapp | 236/12.2 |
| 4,029,256 | 6/1977 | Dauga | 236/12.2 |
| 4,164,321 | 8/1979 | Riis | 236/12.2 |
| 4,478,362 | 12/1984 | Kitamura et al. | 236/12.2 |

Primary Examiner—William E. Tapolcai
Attorney, Agent, or Firm—Mason, Fenwick & Lawrence

[57] ABSTRACT

A thermostatic mixing valve comprises a casing including inlet ducting for passage of relatively hot and cold fluids e.g. water, to a valve means which control the outflow of mixed fluids from the valve via outlet ducting. An elongate thermostat is located in the ducting and regulates the position of the valve means. The thermostat includes a first shorter portion which is responsive predominantly to the cold fluid and a second longer portion responsive to the mixed fluid, the arrangement being such that when there is a fall in cold fluid pressure the effect of the first (relatively inactive) portion reduces so that the second (active) portion now functions to reduce the hot fluid input and thereby avoid or reduce an undesirable rise in temperature of the discharge mixed fluid which otherwise would occur.

8 Claims, 4 Drawing Sheets

THERMOSTATIC MIXING VALVE

The present invention relates to a thermostatic mixing valve.

A basic form of mixing valve for supplying hot/cold mixed water comprises a simple manual device wherein manual taps control the relative flows of hot and cold water to a mixing zone of the device. The valve will be designed for operation with particular hot and cold fluid pressures i.e. for hot/cold pressure differential within a certain limit. More especially the supply pressure of the hot and cold fluids preferably should be approximately the same essentially giving a zero pressure differential. Frequently however the cold fluid pressure can fall due to an increase demand situation and if the cold water pressure decreases the flow of cold water entering the mixing device will also decrease, but the hot water flow will remain constant if the hot water pressure remains unchanged. This could result in a temperature rise in the discharged mixed water (as shown in graph A in the attached FIG. 1) requiring adjustment of the tap settings to restore the original temperature. In the case of a thermostatic mixing valve, the relative hot and cold fluid flows are controlled by valve means which are set by a thermal responsive element, and the above problem is to some degree ameliorated. Thus, the increase temperature of the mixed water will expand the thermal responsive element which consequently alters the setting of the valve means to decrease the hot water flow and increase the cold water flow (still at reduced pressure) entering the valve, and eventually equilibrium conditions will exist with the thermal element at a new expanded condition and the valve means set correspondingly. In previous thermostatic mixing valves a definite rise of temperature at the mixed water discharge still occurred when there was a pressure drop in the cold water supply, although not as severe as for the case of the manual device.

It is an object of the present invention to provide a thermostatic mixing valve which obviates or mitigates the above problem.

According to the present invention there is provided a thermostatic mixing valve comprising a valve body, first and second inlets for relatively hot and cold fluids respectively in the body, valve means controlling fluid flows through the fluid inlets, a thermostatic control device for the valve means including an outer part containing an element for engagement with an abutment in the valve body and an inner part joined to the outer part by an intermediate portion, a spring member in the valve body which urges the thermostatic control device into engagement with the abutment, the inner part of the thermostatic control device defining a thermal responsive element including a first, passive, portion and a second active, portion, first duct means in the valve body for directing a flow of cold fluid from the first inlet onto the first portion of the thermal responsive element so that the first portion is responsive essentially only to the temperature of the cold fluid, and second duct means in the body for directing a flow of fluid from the second fluid inlet to engage and mix with cold fluid so that mixed fluid passes onto the second portion of the thermal responsive element responsive to the temperature of the mixed fluid, the arrangement being such that the length of the second, active, portion varies automatically by length transfer with the first, passive portion when changes in pressure of the hot and cold fluids passing to the thermal responsive element occur, to compensate for those pressure changes.

Preferably the ducting introduces the cold fluid to the thermal responsive element upstream from the introduction of the mixed fluid to said thermal responsive element thereby forming said first and second portions of the thermal responsive element.

In a preferred embodiment, the valve means comprises an annular member located between opposed seatings whereby the hot and cold inlets are defined between said annular member and respective seatings. Preferably the hot fluid flows between the annular valve member and a sleeve surrounding the thermal responsive element towards a reversal zone so as to reverse at said reversal zone at an end of said sleeve for the creation of a mixed flow over the thermal responsive means, the cold fluid being introduced to the thermal responsive element, upstream from said reversal zone of the hot fluid.

Embodiments of the present invention will now be described by way of example with reference to the accompanying drawings wherein:

FIG. 1 shows graphs (A-C) produced by tests on various mixing valves to plot the mixed water temperature against falling cold water supply pressure PC. The various terms in the graphs are defined as follows:

COLD WATER PRESSURE is the pressure at the cold inlet to a mixing valve.

CONSTANT PRESSURE indicates a steady or constant pressure at the cold water inlet to a mixing valve.

FALLING PRESSURE indicates a fall or reduction in the cold water pressure at the cold inlet to a mixing valve. It is assumed that the hot water pressure at the hot inlet to the mixing valve remains steady or constant and does not rise or fall.

MIXED WATER TEMPERATURE is the temperature at the outlet from a mixing valve after hot water and cold water have been mixed in the valve.

CONSTANT TEMPERATURE indicates a constant or steady temperature of mixed water at the outlet from a mixing valve when a tap or outlet is opened and the valve is running at its normal flow rate.

MANUAL MIXING VALVE indicates a steady rise in mixed water temperature at the outlet from a manual mixing valve as the cold water pressure at the inlet of that valve falls. A manual mixing valve could be in the form of a monobloc tap or it could be a single outlet tap which has individual hot and cold inlets to it so that the hot water and cold water can be turned on independently to mix in the tap before discharge into a basin or bath.

PRIOR ART THERMOSTATIC MIXING VALVE indicates a temperature rise of the mixed water leaving this valve when the cold water pressure falls and then at point (I) the rise in temperature reaches a limit and becomes steady. This temperature however is higher than the original constant temperature and is invariably unacceptably high.

INVENTIVE MIXING VALVE indicates the characteristic of the valves now described. This graph shows a very small rise in temperature or a fall in temperature as the cold water pressure falls. At the point (II) the inventive mixing valve will control the mixed water at a constant temperature. Any rise in temperature will be substantially less than the rise in temperature from a conventional thermostatic mixing valve. Any fall in temperature will be small.

Figure 2:
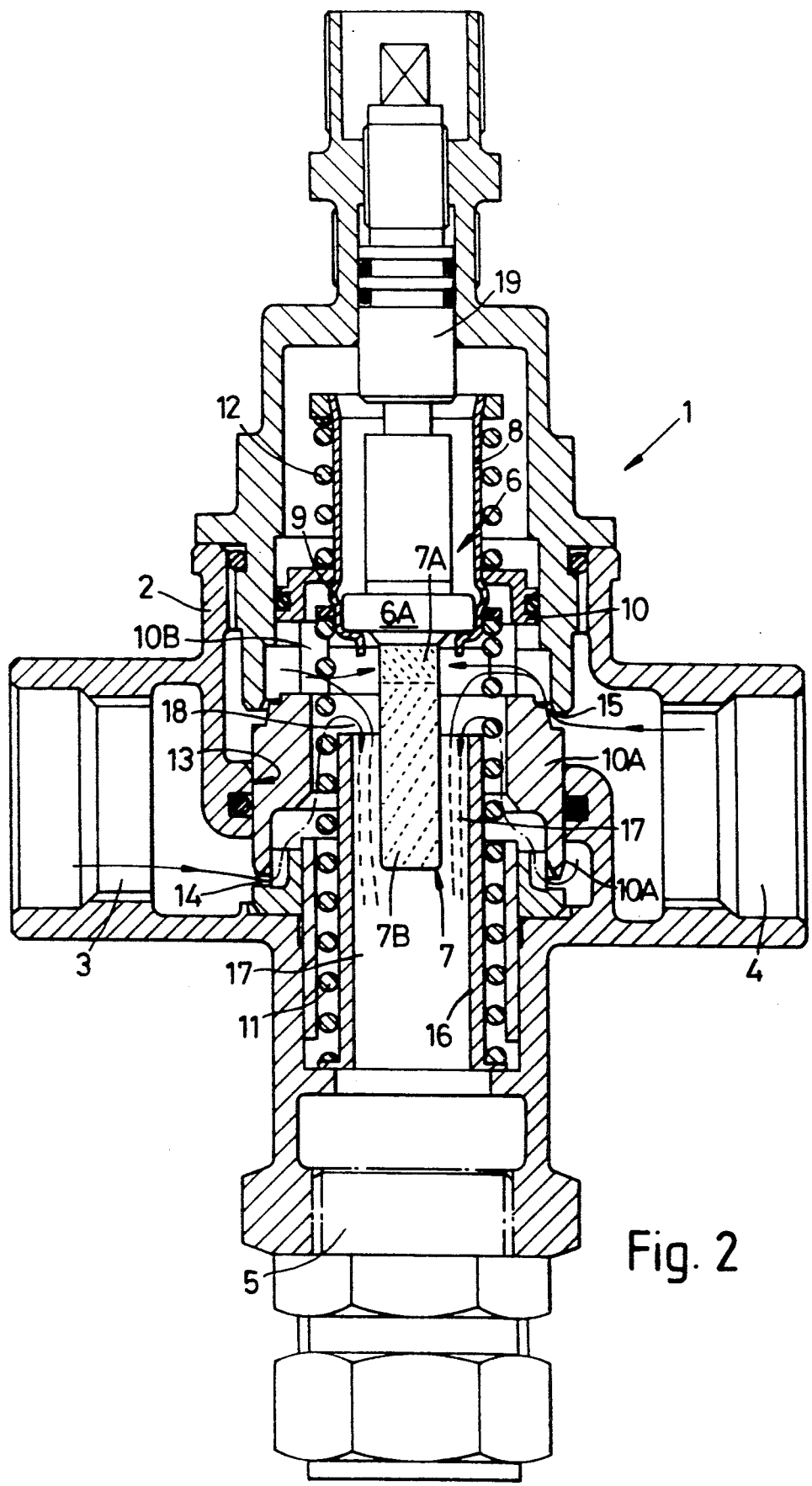
FIG. 2 shows a sectional elevation of a thermostatic mixing valve according to one embodiment of the present invention.

Referring to FIG. 2, a thermostatic mixing valve 1 comprises a casing 2 providing inlet ducts 3,4 for relatively hot and cold fluids (e.g. water) respectively while mixed water is discharged via a duct 5. The temperature of the discharged mixed water is controlled by a thermostatic controller 6 including a temperature responsive (thermostatic) element 7. A flange 6A of the controller 7 is carried by an open bottomed cup 8 and an annular ridge 9 on the cup 8 engages the top end of a slide valve device 10 whereby the device 10 is actuated by the controller 6, the device 10 being positioned by the thermostat element 7 and a return compression spring 11. The valve device 10 includes an annular head 10A sealingly slidable on a cylindrical surface 13 and located between valve seatings so as to define with the seatings a hot inlet 14 and a cold inlet 15 respectively. The thermostat element 7 expands against the compression spring 11 and when the element contracts the compression spring pushes the slide valve device 10 back into a position where a pin of the element 7 is pushed back into the element after it has contracted.

Figure 3C:
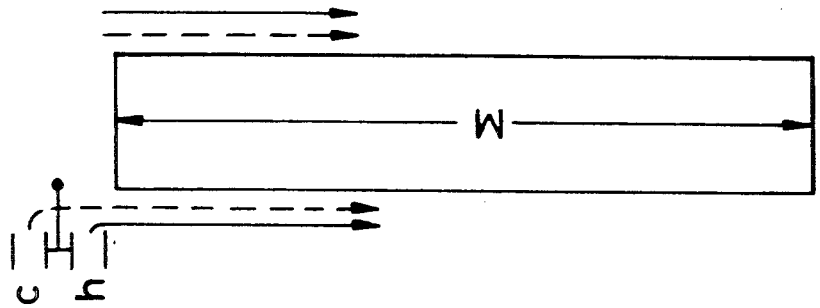
FIGS. 3A, 3B and 3C show schematically the operative conditions at the thermal responsive element for the present valve and a prior art thermostatic valve respectively.
Figure 3B:
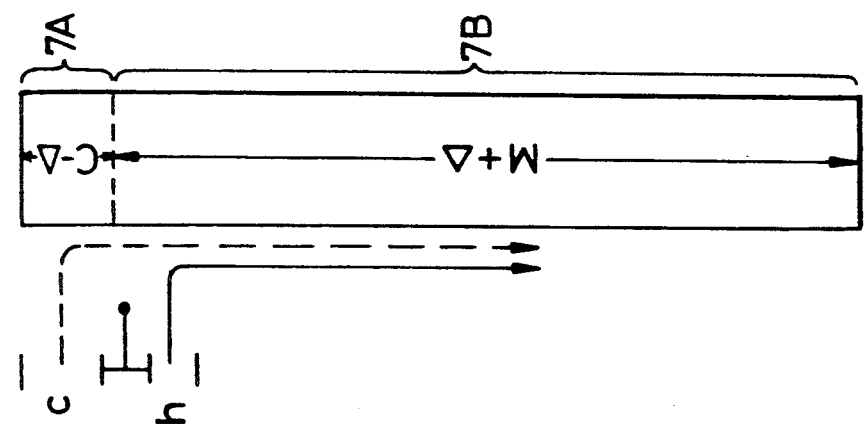
Figure 3A:
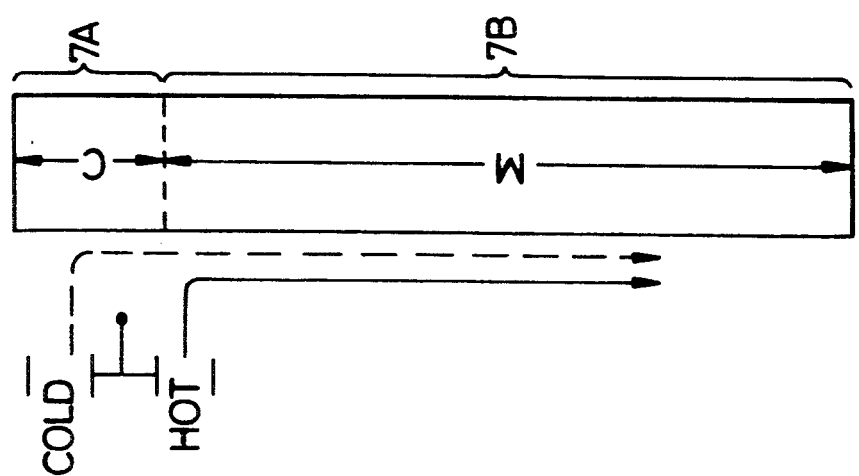

A compression spring 12 serving as an overheat spring is provided to protect the element 7 from damage. Thus if the temperature of the water or fluid surrounding the element causes the element to expand to such an extent that the slide valve device has closed the hot inlet 14 any excess expansion after this closure is absorbed by the compression spring 12. A tubular sleeve 16 surrounds the element 7 such that a passage 17 for downward flow of mixed fluid is located between the sleeve 16 and the element 7. Ducting, partly between the sleeve 16 and the head 10A, serves to deliver the hot water to the passage 17, to this end the hot water reversing at a reverse zone 18 at the top of the sleeve 16, while the cold water is introduced across the top of the head 10A is upstream from above the reversal zone 18 so as to pass to the element 7 via ports 10B in the device 10. By this arrangement, the element 7 is divided into two operative portions, namely a first portion 7A which is essentially solely responsive to the temperature of the cold water and a second portion 7B which is responsive to the temperature of the mixed water. Manual adjuster 19 at the top end of the valve 1 serves for setting of the desired mixed water temperature. Referring especially to FIGS. 3A and B, if there is a fall in cold water pressure at the cold inlet 4 to the thermostatic mixing valve 1 then the flow of cold water over the minor portion (7A) of the thermostat element (7) will be reduced and a smaller portion $(C-\Delta)$ of the element (7) will be in the cold water stream. This means that a larger portion $(M+\Delta)$ of the thermostat element 7 will now be in the mixed water stream and at the mixed water temperature rather than at the cold water temperature.

A larger proportion of the expanding material inside the thermostat element 7 is now subjected to the mixed water temperature and this will give an increased expansion from the thermostat element (in comparison to the prior art arrangement shown in FIG. 3C) moving the valve head 10A to reduce the flow of hot water at the inlet 14 and increase the flow of reduced pressure cold water at the inlet port 15.

If the cold water pressure continuous to decrease then a still larger portion (7B) of the thermostat element 7 will be subjected to the mixed water temperature and a correspondingly greater increase in expansion will be achieved. When the cold water pressure drops to zero there will be no flow at the cold inlet (15) and the thermostat element 7 will expand to close the hot inlet 14. At this point, the thermostat element 7 will expand until the slide valve closes the hot inlet port 14 and there will be no flow through the thermostatic mixing valve 1.

In this arrangement, the thermostat element is used as a two stage thermostat with one stage (7B) always active and the other stage (7A) usually inactive and only brought into service when the flow of cold water entering the valve is reduced because the cold water pressure decreases while the hot water pressure remains constant. The arrangement therefore serves to compensate for the cold supply pressure drop by making a larger portion of the thermostat active to control the flow of water through the inlets 14, 15.

Figure 1:
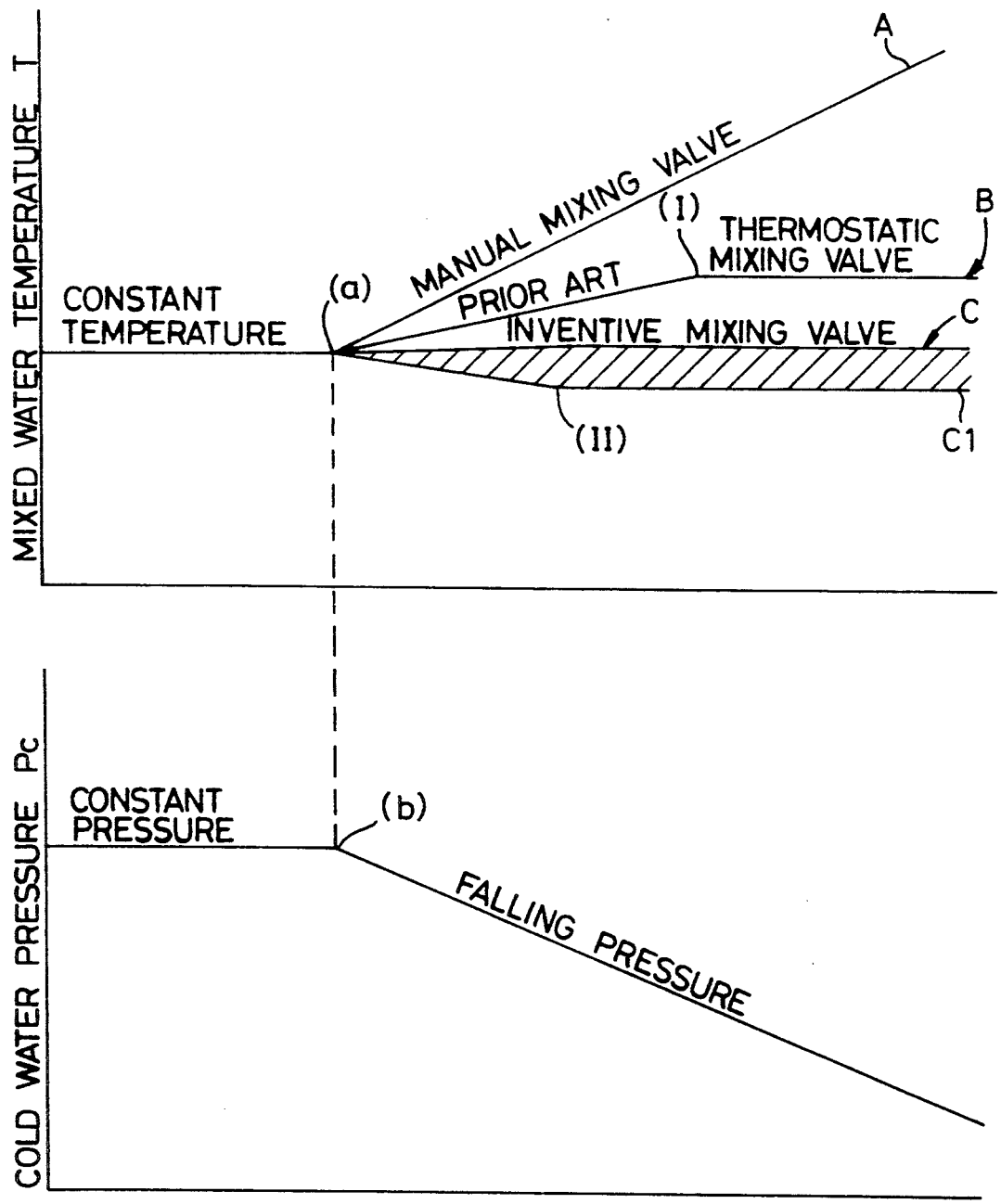
FIG. 1 shows graphs of blended water temperature with regard to the pressure of the cold water supply, for prior art mixing and a valve according to the present invention.

The curve C1 in FIG. 1 shows the mixed water temperature characteristic possible for the valve 1. As can be seen the mixed water temperature gradually falls very slightly as the pressure Pc drops. The amount of temperature fall of the valve 1 is less than the amount of temperature rise in the prior art thermostatic valve of the curve B. Consequently the valve 1 gives a considerably safer and more acceptable performance for the cold water pressure drop condition; in comparison with prior art mixing valves. It may be possible in some flow conditions for the outlet temperature to remain steady or even rise slightly but any rise will be substantially less than in the graph B: the hatched portion in graph C indicates the probable variation in the characteristic. The precise characteristic will depend on the flow rate through the valve and also on the temperature of the hot and cold water entering the valve. The dotted line in FIG. 1 indicates that the change in outlet temperature takes place immediately there is a fall in cold water pressure.

Figure 4:
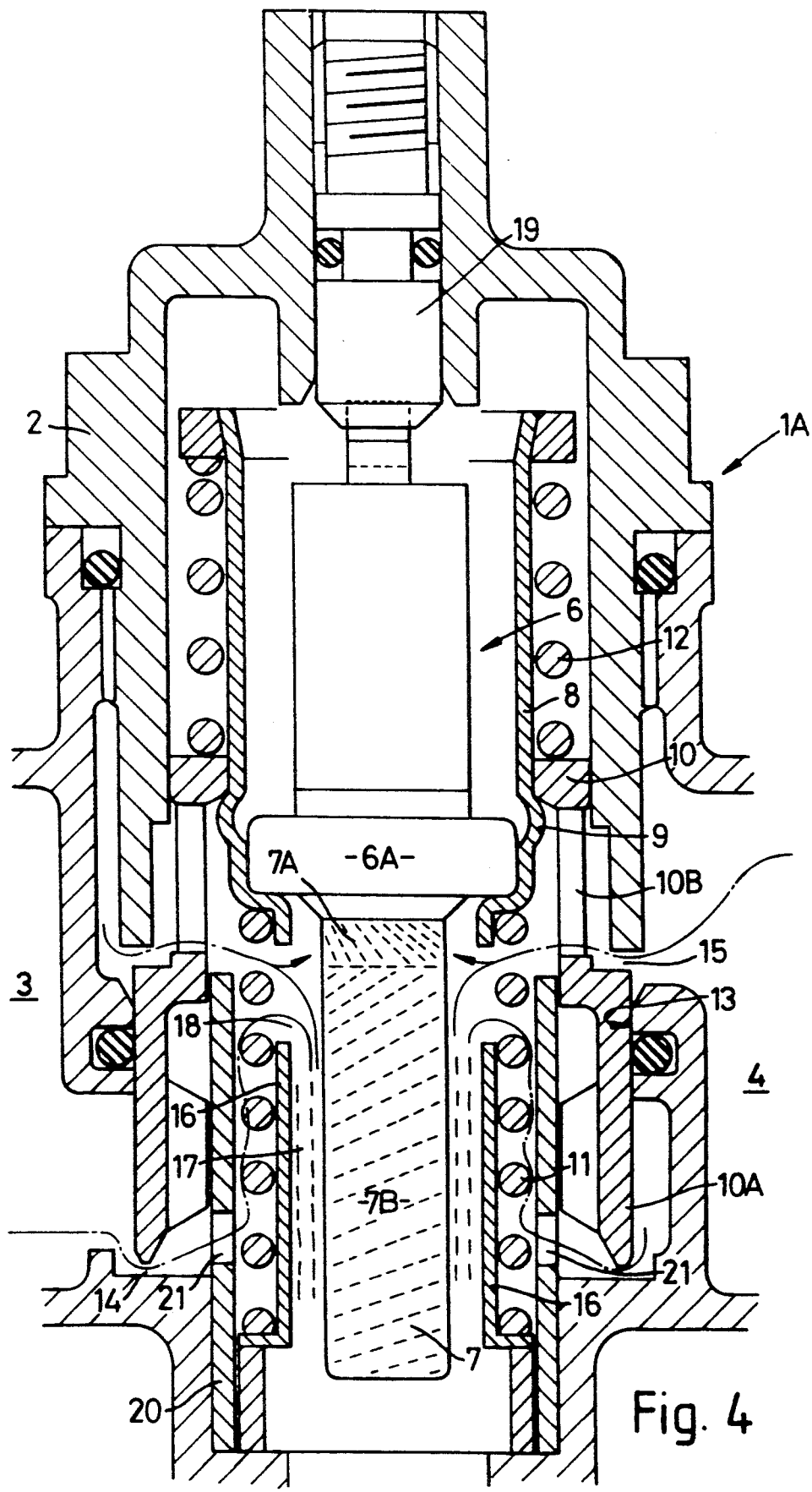
FIG. 4 shows a view similar to FIG. 2 for another embodiment.

Whereas the above is concerned with a fall in cold water pressure the valve also operates in accordance with the invention where there is a rise in hot water pressure (with the cold water pressure unchanged). In particular it is a feature of the present valve to ensure that whenever the hot water pressure exceeds the cold water pressure for whatever reason, the resulting mixed water temperature will rise very slightly then fall slightly to a temperature only a little below the original mixed water temperature. FIG. 4 shows a further thermostatic mixing valve 1A in accordance with the present invention and generally similar to the valve 1 of FIG. 2, and like parts carry like reference numeral numbers. However, in this case, the tubular member 20 at the valve seat of inlet 14 carries ports 21 whereby the hot fluid flows directly from the inlet 14 to the space between the sleeve 16 and member 20. Whence it passes to the passage 17. Operation of the valve 1A is similar to that of valve 1.

In addition to the ability of the above inventive valves to provide improved mixed water temperature control when there is a change in pressure such that the hot water pressure becomes higher than the cold water pressure, these valves will also provide improved temperature control when the cold water temperature rises. This benefit is achieved by virtue of the dormant part 7A of the element 7 which is surrounded by cold water becoming more active if the cold water temperature rises. This is of significance as the cold water temperatures can vary by up to 15° C. between summer and winter and depending upon the amount of mixed water used.

Further modifications will of course be possible, particularly with regard to the way the pressure drop compensator sets the hot and cold fluid inlets.

I claim:

1. A thermostatic mixing valve comprising:

a valve body including an abutment;

first and second inlets for relatively cold and hot fluids, respectively, in said body;

valve means for controlling fluid flows through said fluid inlets;

thermostatic control means for thermostatically controlling said valve means, said thermostatic control means including an outer part containing engagement means for engaging said abutment in said valve body, an inner part, and an intermediate part joining said inner part to said outer part, said inner part of said thermostatic control means defining a thermal responsive element including a first, passive, portion and a second, active, portion;

first duct means in said valve body for directing a flow of cold fluid from said first inlet onto said first portion of said thermal responsive element, whereby said first portion is responsive essentially only to the temperature of the cold fluid;

second duct means in said valve body for directing a flow of hot fluid from said second fluid inlet to engage and mix with cold fluid to form a mixed fluid and for directing a flow of mixed fluid onto said second portion of said thermal responsive element, whereby said second portion is responsive to the temperature of the mixed fluid; and spring means in said valve body for urging said thermostatic control means into engagement with said abutment;

said second, active, portion having a length which varies automatically with changes in pressure of the hot and cold fluids passing to said thermal responsive element to compensate for these pressure changes.

2. A thermostatic mixing valve according to claim 1, wherein said first duct means introduces the cold fluid to said thermal responsive element upstream from the introduction of the mixed fluid to said thermal responsive means thereby forming said first and second portions of said thermal responsive element.

3. A thermostatic mixing valve according to claim 1, wherein said valve means comprises opposed seatings and an annular valve member located between said opposed seatings, whereby said first and second inlets are defined between said annular valve member and respective seatings.

4. A thermostatic mixing valve according to claim 3, further comprising:

a sleeve surrounding said thermal responsive element and having first and second ends and a reversal zone at said first end of said sleeve; and wherein said second duct means comprises a passage between said annular valve member and said sleeve, the hot fluid reversing at said reversal zone at said first end of said sleeve for the creation of a mixed flow over said thermal responsive element, the cold fluid being passed onto said thermal responsive element, upstream from said reversal zone of the hot fluid.

5. A thermostatic mixing valve according to claim 1, wherein said temperature responsive element comprises an elongate member formed of thermal responsive material, a first section of the length of said elongate member defining said first portion, while a second section of the length of said elongate member defines said second portion.

6. A thermostatic mixing valve according to claim 5, wherein said second section is substantially longer than said first section.

7. A thermostatic mixing valve according to claim 5, wherein said elongate member has a first end coupled to said valve means via said intermediate portion and a second end which is free.

8. A thermostatic mixing valve according to claim 7, wherein said first section is adjacent said first end.

* * * * *